United States Patent
Bley et al.

(10) Patent No.: US 6,277,177 B1
(45) Date of Patent: Aug. 21, 2001

(54) GAS PASSAGE WITH SELECTIVELY ACTING PENETRATION SURFACE AND PROCESS FOR PRODUCING THE PENETRATION SURFACE

(75) Inventors: Werner Grosse Bley, Bonn; Thomas Bohm, Cologne; Ulrich Dobler, Wermelskirchen; Manfred Lacher, Mainz; Thomas Zetterer, Engelstadt, all of (DE)

(73) Assignee: Leybold Vakuum GmbH, Cologne (DE)

( * ) Notice: Subject to any disclaimer, the term of this patent is extended or adjusted under 35 U.S.C. 154(b) by 0 days.

(21) Appl. No.: 08/973,930

(22) PCT Filed: Jun. 1, 1996

(86) PCT No.: PCT/EP96/02378

§ 371 Date: Dec. 8, 1997

§ 102(e) Date: Dec. 8, 1997

(87) PCT Pub. No.: WO96/41677

PCT Pub. Date: Dec. 27, 1996

(30) Foreign Application Priority Data

Jun. 10, 1995 (DE) .............................................. 195 21 275

(51) Int. Cl.$^7$ ...................................................... B01D 53/22
(52) U.S. Cl. ........................................................ 96/4; 96/7
(58) Field of Search ................................................ 96/4, 7

(56) References Cited

U.S. PATENT DOCUMENTS

| 3,828,527 | 8/1974 | Briggs et al. . |
| 3,939,695 | 2/1976 | Booth . |
| 5,661,229 | 8/1997 | Bohm et al. . |

FOREIGN PATENT DOCUMENTS

| 0 264 594 B1 | 8/1987 | (EP) . |
| 0264594 | 4/1988 | (EP) . |
| 0 352 371 A2 | 11/1988 | (EP) . |
| 8908489 | 9/1989 | (WO) . |
| WO 95/04922 | 2/1995 | (WO) . |
| 9513860 | 5/1995 | (WO) . |

Primary Examiner—Bernard Lipman
(74) Attorney, Agent, or Firm—Wall Marjama & Bilinski

(57) ABSTRACT

A gas passage (1) with a selectively acting penetration surface consisting of quartz, quartz glass, Pyrex glass or the like; in order to provide penetration surfaces which are relatively thin on the one hand but will withstand relatively great pressure differences on the other, it is proposed that the selectively acting penetration surface take the form of a plurality of adjacent windows (5).

20 Claims, 1 Drawing Sheet

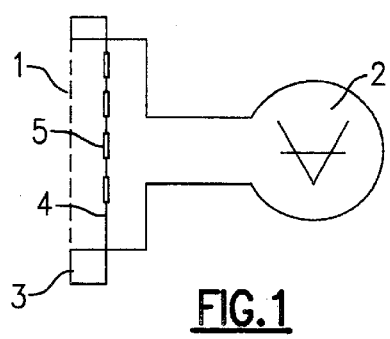
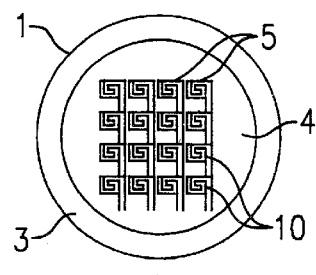
FIG.1        FIG.2
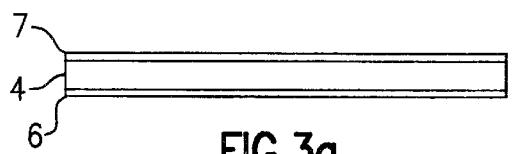
FIG.3a        FIG.3b
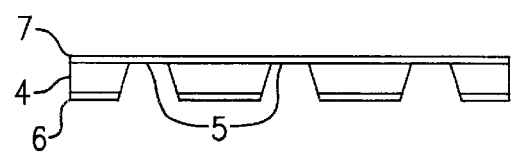
FIG.3c
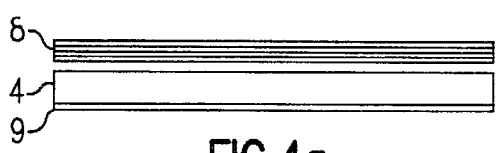
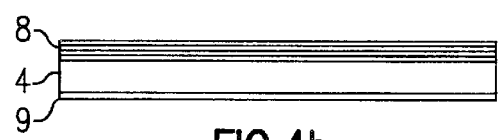
FIG.4a        FIG.4b
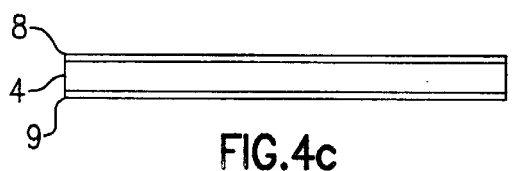
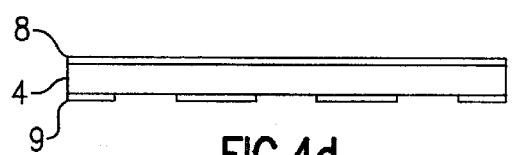
FIG.4c        FIG.4d
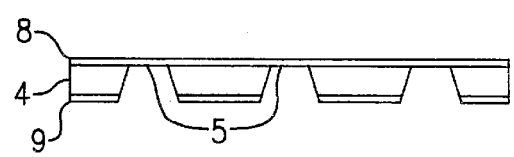
FIG.4e

GAS PASSAGE WITH SELECTIVELY ACTING PENETRATION SURFACE AND PROCESS FOR PRODUCING THE PENETRATION SURFACE

BACKGROUND OF THE INVENTION

The invention relates to a gas passage with a selectively acting penetration surface. Moreover, the present invention relates to a process for manufacturing a selectively acting gas passage. Gas passages of this kind are employed in measurement or analytical instruments, for example. It is aimed at admitting lighter gases with a high preference and heavier gases with a lower preference into a measuring instrument, for example.

As disclosed in DE-A-43 26 265, for example the entire contents of which are incorporated by reference, a leak detector is known, the test gas detector of which is equipped with a selective admission system. Helium is used as the test gas. The selective admission comprises a penetration surface formed by a separating wall or a diaphragm, in which the permeability for helium is by many decades higher than the permeability for other gases. For example, quartz, quartz glass ($SiO_2$), Pyrex glass or also polymer diaphragms made of FEP, for example, offer these properties.

Generally, measuring and analytical instruments should be of high sensitivity and offer a short response time. In a test gas detector according to incorporated DE-A-43 26 265 it is therefore a design target to let as much helium as possible penetrate the penetration surface in a time which is as short as conceivable. This is only possible when on the one hand the penetration surface is as large as possible and when on the other hand it is as thin as possible. This is opposed by the fact that generally the penetration surface will be exposed to a differential pressure. The internal volume of the measuring instrument is evacuated whereas atmospheric pressure prevails outside. Because of the load imposed by the differential pressure there are limitations as to the size and thickness of the penetration surface.

SUMMARY OF THE INVENTION

It is the task of the present invention to create a selectively acting gas inlet which may be exposed to relatively high pressure differentials, and which none-the-less offers a relatively large and relatively thin penetration surface.

This task is solved by the present invention in that the selectively acting penetration surface be formed by a plurality of adjacent windows. In the case of this solution the individual windows of the penetration surface are very small. The smaller the surface area of the windows, the thinner the window forming layer, diaphragms, or the like may be in order to withstand the prevailing pressure differential. If, for example, 200 square windows made of quartz glass having a length of sides of 0.7 mm are provided, then these form a total penetration surface of 0.98 $cm^2$. A penetration surface of this kind may already be loaded with a differential pressure of one atmosphere when the thickness of the individual windows amounts to about 5 to 10 $\mu m$.

It is known that heating of a material reduces the response time and increases the gas throughput. In the case of a gas inlet according to the present invention it is possible through the planar arrangement to bond—by means of metal structures produced by thin-film technology—heating coils to the windows. Thus there exists the possibility of restricting the heat to the individual windows. The risk that glued joints in the vicinity may degrade or develop leaks does not exist.

Preferably the windows forming the penetration surface are made of quartz, quartz glass or similar materials (Pyrex glass, for example) since these may be manufactured with methods known from thin-film technology at reasonable cost.

BRIEF DESCRIPTION OF THE DRAWINGS

Further advantages and details of the present invention shall be explained by referring to the design examples presented schematically in drawing FIGS. 1 to 4.

FIG. 1 is a pressure gauge with a gas inlet designed according to the present invention, FIG. 2 is a top view on to the inlet with a penetration surface consisting of 16 windows and FIGS. 3(a)–3(c) and FIGS. 4(a)–4(e) are side sectional views depicting the manufacture of penetration windows in accordance to a pair of specific embodiments according to the present invention.

DETAILED DESCRIPTION OF THE INVENTION

In FIGS. 1 and 2 the inlet according to the present invention is generally designated as 1. It is the inlet to a vacuum gauge symbolically shown by reference numeral 2.

The inlet 1 comprises a flange 3 which is used to hold a disk 4. Disk 4 is equipped with a plurality of windows 5, which define a corresponding plurality of small gas penetrating surfaces. Since the windows 5 are relatively small, the layers forming the windows—diaphragms or the like—may be very thin in order to be able to expose these to a certain differential pressure. Through the present invention it is possible to equip gas passages with relatively large but relatively thin gas penetration surfaces.

Preferably quartz or quartz glass is used as the material for the penetration surfaces since numerous methods from the area of semiconductor engineering are known for processing this material.

A method for manufacturing penetration surfaces made of quartz glass is explained by referring to FIGS. 3(a)–3(c). A silicon wafer 4 is initially coated with $SiO_2$ in an oxidation process (shown as layers 6, 7 in FIG. 3(a). Generally oxidation process this is performed in a mixture of water vapour and oxygen at temperatures of about 1100° C. which will produce—depending on the process parameters—oxide layers having a thickness of about 5 $\mu m$. After the oxidation process, the front and rear sides of the Si wafer are passivated against the subsequent process steps, for example by a 300 nm thick layer of PECVD-SiC. Next, the window geometry and arrangement are defined on the rear side of the Si wafer by means of a photolithography process. This results in openings in the photoresistive layer and the ability to remove, at these locations the passivation and the $SiO_2^1$) layer by means of an etching process, like reactive ion etching, as shown, for example, in FIG. 3(b). Next, the windows 5 may be etched free in a further etching process, such as by wet-chemical etching of Si in KOH, as shown, for example, in FIG. 3(c).

Alternately, and instead of an oxidation process to produce the $SiO_2^2$) layers, other coating processes, for example, such as plasma supported CVD or low pressure CVD processes may be employed which offer the desired properties relating to selectivity. A further method of manufacturing gas selective diaphragms is detailed in FIG. 4, in which first substrate 4, a silicon wafer for example, is bonded in a vacuum tight manner to a second substrate 8 made from a gas selective material such as, Pyrex glass, by means from anodic bonding (FIGS. 4(a), 4(b)). The rear side of the first substrate 4 is provided with a corresponding passivation 9, which subsequently may be structured by photolithography means. In a mechanical or chemical process step (grinding, polishing, etching etc.) the thickness of the gas selective material second substrate is reduced to a certain thickness (FIG. 4(*c*)). Window openings on the rear of the substrate 4 are defined (FIG. 4(*d*)) by means of a photolithography or etching process, where said windows are etched free in a further etching process (FIG. 4(*e*)).

2) The German text reads SiO2 where $SiO_2$ would be appropriate. The latter has been assumed for the translation.

The window surfaces 5 of quartz, quartz glass, Pyrex glass or the like are each preferably equipped with a heating coil 10. This may be performed by relying on thin-film production methods. Conductive material is deposited by means of a vacuum coating method and structured meander-like in combination with a photolithography process, for example by a lift-off or an etching process. Heating coils of this kind are indicated in drawing FIG. 2 and designated as 10. The heating 10 are electrically bonded so that they may be connected into an electric circuit. Through this kind of heating arrangement each of the diaphragms may be heated at a precise spot to high temperatures (about 500° C.) without heating up the entire substrate 4. This avoids heating, degassing or the occurrence of leaks in possibly present glued joints which join disk 4 to the flange 3. Moreover, current consumption is reduced and heating up of the entire detection system is avoided.

The use of the gas passage according to the present invention is especially advantageous in test gas detectors for leak detectors which operate with lighter gases, preferably helium as the test gas (such as described in previously incorporated DE 43 26 265). Also in analytical instruments for lighter gases ($H_2$, HD, $D_2$, $^3He$, He etc.)[3] the use of the described gas inlet described is advantageous to increase gas throughput and to improve the response time.

3) The German text reads "(H2, HD, D2, 3He, He etc.)" where "($H_2$, HD, $D_2$, $^3He$, He etc.)" would be appropriate. The latter has been assumed for the translation.

What is claimed is:

1. A gas inlet used in connection with a test gas detector, said test gas being a light gas, in which said inlet includes a gas passage having a selectively acting penetration surface consisting of a plurality of windows formed in a substrate, each of said windows being formed of a thin silicon-based gas selective material and formed in an array.

2. A gas inlet used in connection with an analytical instrument for light gases, said inlet including a gas passage defined by at least one substrate having a plurality of windows consisting of a thin silicon-based gas selective material, said windows having a thin thickness and arranged in an array.

3. A gas inlet as recited in claim 1, wherein the gas selective material is at least one of the group of quartz, quartz glass or Pyrex glass.

4. A gas inlet as recited in claim 1, including an array of small thin windows to form a relatively large total surface area.

5. A gas inlet as recited in claim 4, wherein said array includes approximately 200 square windows, each said window having sides which are about 0.7 mm in length so as to define a surface area of about 1.0 $cm^2$.

6. A gas inlet as recited in claim 1, wherein said windows are each formed from diaphragms resulting from a deposition or growth process.

7. A gas inlet as recited in claim 1, wherein said windows are formed from a first substrate which is bonded to a second substrate, said substrates being processed to form thin diaphragms and define the penetration surfaces.

8. A gas inlet as recited in claim 7, wherein said windows are formed in one of said substrates using an etching process.

9. A gas inlet as recited in claim 8, wherein said etching process includes anisotropic etching of silicon in potassium hydroxide, one of said substrates being made from silicon which is etched to form said windows.

10. A gas inlet as recited in claim 6, wherein the material resulting from a deposition or growth process consists of one of the group of silicon oxide, silicon nitride, silicon oxide nitride, silicon carbide, or Pyrex glass.

11. A gas inlet as recited in claim 1, wherein each of said windows defining said penetration surface includes a heating coil.

12. A gas inlet as recited in claim 2, wherein the gas selective material is at least one of the group of quartz, quartz glass or Pyrex glass.

13. A gas inlet as recited in claim 2, including an array of small thin windows to form a relatively large total surface area.

14. A gas inlet as recited in claim 13, wherein said array includes approximately 200 square windows, each said window having sides which are about 0.7 mm in length so as to define a surface area of about 1.0 $cm^2$.

15. A gas inlet as recited in claim 2, wherein said windows are each formed from diaphragms resulting from a deposition or growth process.

16. A gas inlet as recited in claim 2, wherein said windows are formed from a first substrate which is bonded to a second substrate, said substrates being processed to form thin diaphragms and define the penetration surfaces.

17. A gas inlet as recited in claim 16, wherein said windows are formed in one of said substrates using an etching process.

18. A gas inlet as recited in claim 17, wherein said etching process includes anisotropic etching of silicon in potassium hydroxide, one of said substrates being made from silicon which is etched to form said windows.

19. A gas inlet as recited in claim 15, wherein the material resulting from a deposition or growth process consists of one of the group of silicon oxide, silicon nitride, silicon oxide nitride, silicon carbide, or Pyrex glass.

20. A gas inlet as recited in claim 2, wherein each of said windows defining said penetration surface includes a heating coil.

* * * * *